R. M. NICHOLSON.
INDICATING DEVICE FOR VEHICLES.
APPLICATION FILED DEC. 4, 1915.

1,227,186. Patented May 22, 1917.

WITNESSES:

INVENTOR
Robert M. Nicholson
BY
Hardway & Cathey
ATTORNEYS

UNITED STATES PATENT OFFICE.

ROBERT M. NICHOLSON, OF HOUSTON, TEXAS.

INDICATING DEVICE FOR VEHICLES.

1,227,186.

Specification of Letters Patent.   Patented May 22, 1917.

Application filed December 4, 1915.   Serial No. 65,028.

*To all whom it may concern:*

Be it known that I, ROBERT M. NICHOLSON, a citizen of the United States, residing at Houston, in the county of Harris and State of Texas, have invented certain new and useful Improvements in Indicating Devices for Vehicles, of which the following is a specification.

This invention relates to new and useful improvements in an indicating device for vehicles.

The object of the invention is to provide a device of the character described designed particularly to be attached to automobiles and other similar vehicles for the purpose of indicating to those following, the intended movement of the vehicle to which the device is attached.

With the above and other objects in view the invention has particular relation to certain novel features of construction, operation, and arrangement of parts an example of which is given in this specification and illustrated in the accompanying drawing, wherein.

Figure 1:
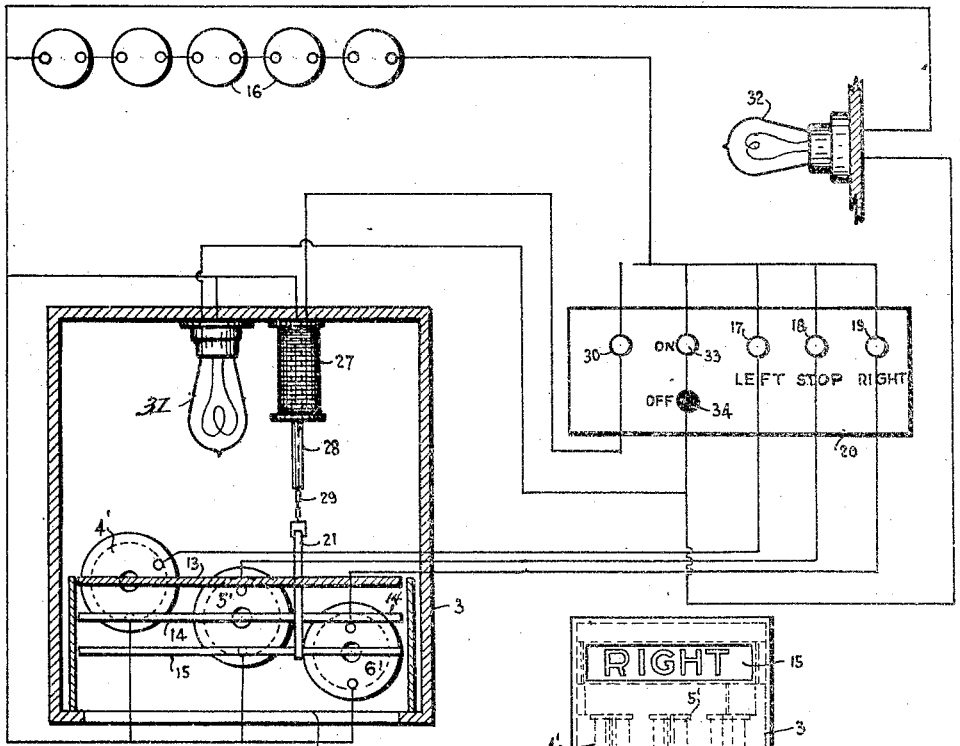
Figure 1 shows a transverse sectional view of the indicating device together with a diagrammatic view of the electrical wiring connected therewith.
Figure 3:
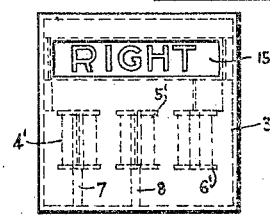
Fig. 3 shows a rear view indicating that the intended movement is to the right.
Figure 2:
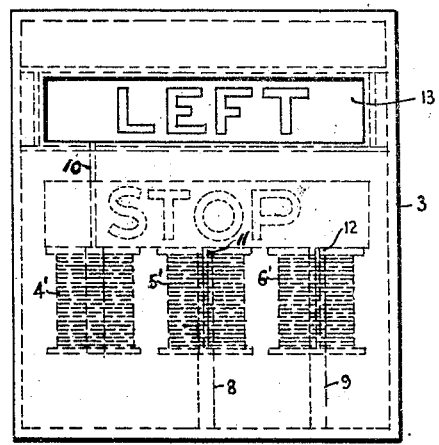
Fig. 2 shows a rear view of the device in position to indicate that the intended movement of the vehicle is to the left.

Referring now more particularly to the drawings wherein like numerals of reference designate similar parts in each of the figures, the numeral 3 refers to a box-like casing formed of sheet metal or some other suitable material. The rear side of this casing has the transverse window opening 4, above and below which are the transverse partitions 5 and 6 respectively extending from end to end of the casing and extending from the rear approximately one-half way to the front wall thereof. Underneath these partitions there are three solenoids 4', 5' and 6', consisting of spool-shaped coils having the slidable cores 7, 8 and 9 respectively, which operate in the well known manner. These respective cores have the rods 10, 11 and 12 upstanding therefrom, to the upper ends of which are secured the oblong plates 13, 14 and 15, respectively, which have suitable letters cut therethrough forming the desired words, those shown being "Left", "Stop", and "Right", respectively.

Figure 4:
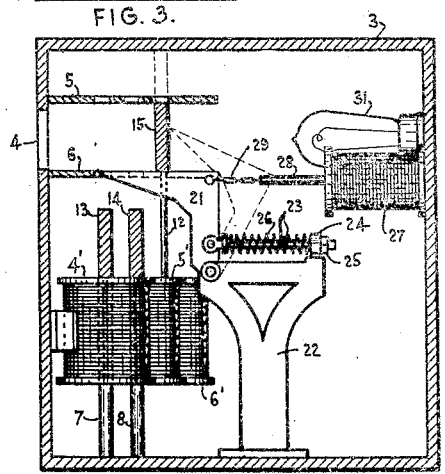
Fig. 4 shows a vertical sectional view of the device.

Suitable batteries as 16 are provided and a system of wiring connects said batteries with said coils 4', 5' and 6'. Said batteries may be connected with or disconnected from said respective coils by means of the push plugs 17, 18 and 19, respectively, carried by the switch board 20. When either of said coils is so connected, it will be energized and its corresponding core will be elevated to a central position, lifting the corresponding plate 13, 14, or 15 as the case may be in alinement with the window 4, said plate passing through alined slots in the partitions 5 and 6. A catch 21 is provided formed of two arms extending at right angles, the free end of one of which is pivoted to the supports 22, the other arm being free and normally extending horizontally over the plates 13, 14 and 15 and having its under side beveled upwardly. When either of said plates 13, 14 or 15 is forced upwardly as above explained, it contacts with the beveled portion of the horizontal arm and forces said catch back to the position shown in dotted lines in Fig. 4, permitting said plate to pass by said free end. Pivoted to the vertical arm of the catch is the rod 23, which is slidable through the bearing 24 carried by the support 22 and whose free end has the nut 25 secured thereto. A coil spring 26 surrounds said rod and is interposed between said catch and bearing and when said plate passes the free end of the catch 21, said catch is by said spring forced back into its original position underneath the elevated plate and when the corresponding plug is released, the electrical current will be cut off from the coil corresponding to the elevated plate and said plate will be held in elevated position in alinement with the window 4 by said catch 21. A solenoid 27 having the core 28 is provided. This core is connected to the catch 21 through the flexible connection 29 and the coil of the solenoid 27 is connected with the batteries 16 through suitable wiring, said wiring being provided with the push plug 30 for connection and disconnection. When it is desired to lower the elevated plate connection is formed between the batteries and the solenoid 27, which will result in a pull being exerted against the catch 21 through the core 28 and the flexible connection 29 and said catch will thereby be released from under the elevated plate and said plate will by force of gravity drop to its original position and when said plug 30 is released the spring 26 will operate to force the catch back into its normal position. Electric lights 31 and 32 are provided, one of which is secured in a suitable socket in the front wall of the casing 3 in alinement with the window 4 and the other one of which is arranged in front of the driver. These lights are connected with the batteries 16 and are simultaneously turned on and off by the manipulation of the respective push plugs 33 and 34, all of said plugs being carried by the switch board 20.

When the light 31 is turned on it will render visible to those in the rear of the automobile the word cut through the plate which is elevated in front of said light. It is obvious that by pressing either of the plugs 17, 18 or 19 the corresponding plate will be elevated and held in position between the window 4 and the light 31 and by pressing the plug 33 the light 31 will be turned on and thus the driver of the automobile may indicate to those following whether he intends to turn to the right, left or to stop. It is, of course, obvious that additional word plates may be provided so that all of the various movements of the automobile may be indicated in advance.

What I claim is:

1. A device of the character described including a pair of solenoids, each having a slidable core, a casing, wherein said solenoids are mounted, having a window opening, a plate supported by the core of one of said solenoids whereby said plate may be elevated into alinement with said opening when said solenoid is energized, a catch arranged to engage under said plate when elevated and hold it in elevated position, said catch being connected to the core of the other solenoid, and thereby withdrawn from under the plates when its solenoid is energized, a light arranged opposite the window opening and electrical connection arranged to connect said solenoids and light with and disconnect them from a source of electrical supply.

2. A device of the character described, including a pair of solenoids, each having a slidable core, a casing wherein said solenoids are mounted having a window opening, an electric light arranged opposite said opening, a plate having designation characters cut therethrough supported by the core of one of said solenoids whereby said plate may be elevated into alinement with said light and opening, a yieldably mounted catch which permits the elevation of said plate but which engages thereunder when elevated and holds it in its elevated position, said catch being connected to the core of the other solenoid whereby it may be withdrawn from under said plate, and electrical connections arranged to connect said solenoids and light with and disconnect them from a source of electrical supply.

3. A device of the character described including a casing having a window opening, transverse partitions in the casing one above the other below said opening, said partitions extending from end to end of the casing, and from the rear thereof only, part of the way to the front, a pair of solenoids in the casing each having a slidable core, a plate supported by the core of one of said solenoids and adapted to be elevated by said core through alined slots in said partitions into alinement with said window opening, a catch pivoted at one end and whose other end is free and normally extends over the plates, said free end having its under side beveled upwardly, said catch being yieldably mounted so as to permit the elevation of said plate and to engage thereunder when the plate is in elevated position, said catch being connected to the core of the other solenoid whereby it may be withdrawn from under said plate, and electrical connection arranged to connect said solenoids with and disconnect them from a source of electrical supply.

In testimony whereof I have signed my name to this specification in the presence of two subscribing witnesses.

ROBERT M. NICHOLSON.

Witnesses:
F. A. LIDDELL,
E. L. CATHEY.